Dec. 8, 1925.

H. O. BEDGOOD

ROLLER BEARING FOR TURNTABLES

Filed May 22, 1924

INVENTOR
Hubert Oswald Bedgood
By John B. Brady
Attorney

Dec. 8, 1925.

H. O. BEDGOOD 1,564,928

ROLLER BEARING FOR TURNTABLES

Filed May 22, 1924  2 Sheets-Sheet 2

INVENTOR
Hubert Oswald Bedgood
By John B Brady
Attorney

Patented Dec. 8, 1925.

1,564,928

UNITED STATES PATENT OFFICE.

HUBERT OSWALD BEDGOOD, OF GLASGOW, SCOTLAND, ASSIGNOR TO LOBNITZ & COMPANY LIMITED, OF RENFREW, SCOTLAND.

ROLLER BEARING FOR TURNTABLES.

Application filed May 22, 1924. Serial No. 715,185.

*To all whom it may concern:*

Be it known that I, HUBERT OSWALD BEDGOOD, of Glasgow, Scotland, a subject of the King of Great Britain, have invented certain new and useful Improvements in and Relating to the Roller Bearings for Turntables, of which the following is a specification.

This invention relates to the roller bearings of turntables for revolving cranes, excavators and the like.

In the slewing or revolving type of crane, excavator or the like the sub-structure is composed of an upper revolvable platform carrying the jib operating machinery, an intermediate anti-friction bearing of rollers suitably spaced apart, and a lower platform or base which is generally mounted on transporting trucks, tractors or the like. The roller bearing comprises an annular frame consisting of an outer and inner ring between which a large number of bearing wheels or rollers are arranged, the rings being bound together by distance pieces and the rollers having their spindles passing through the rings. The rollers run between two circular track rails one on the upper platform and the other on the lower platform or base. The distance pieces are arranged intermediate the rollers.

Under this invention instead of having spindles for the rollers and separate distance pieces I make the rollers with members which serve as distance pieces thereby effecting a considerable saving. Moreover the arrangement is such that the rollers and members can be readily removed or replaced.

In order that the invention may be readily understood an embodiment thereof is shown, by way of example, in the accompanying drawings, whereon:—

Referring to the drawings:—

Figure 1:
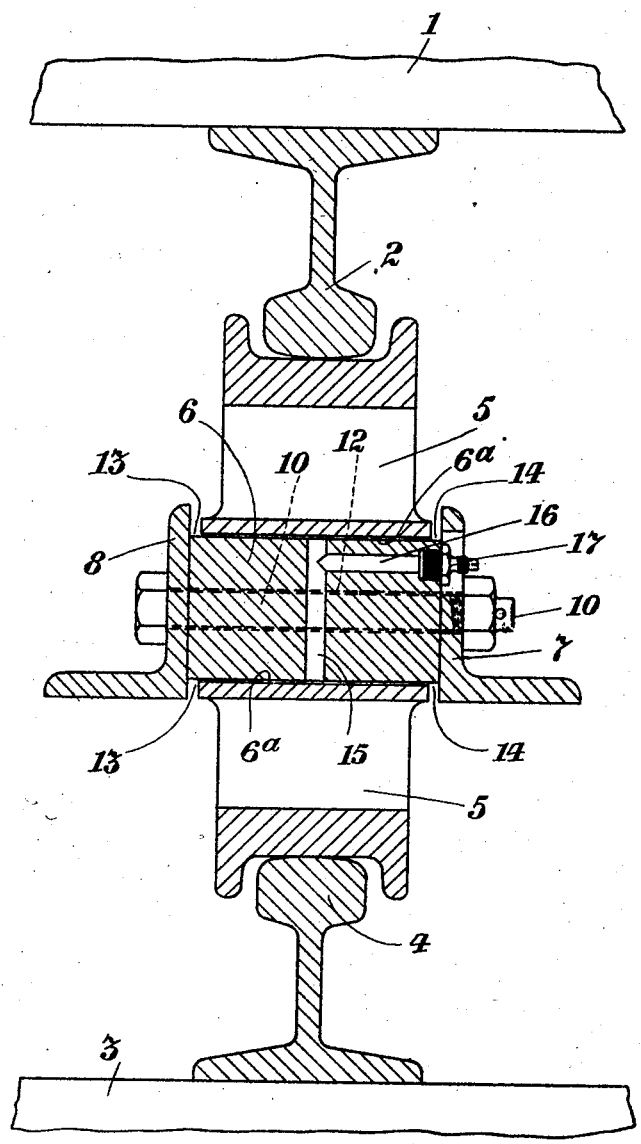
Fig. 1 is a cross section of a roller showing its spindle distance piece and its disposition relative to the ring frame.
Figure 2:
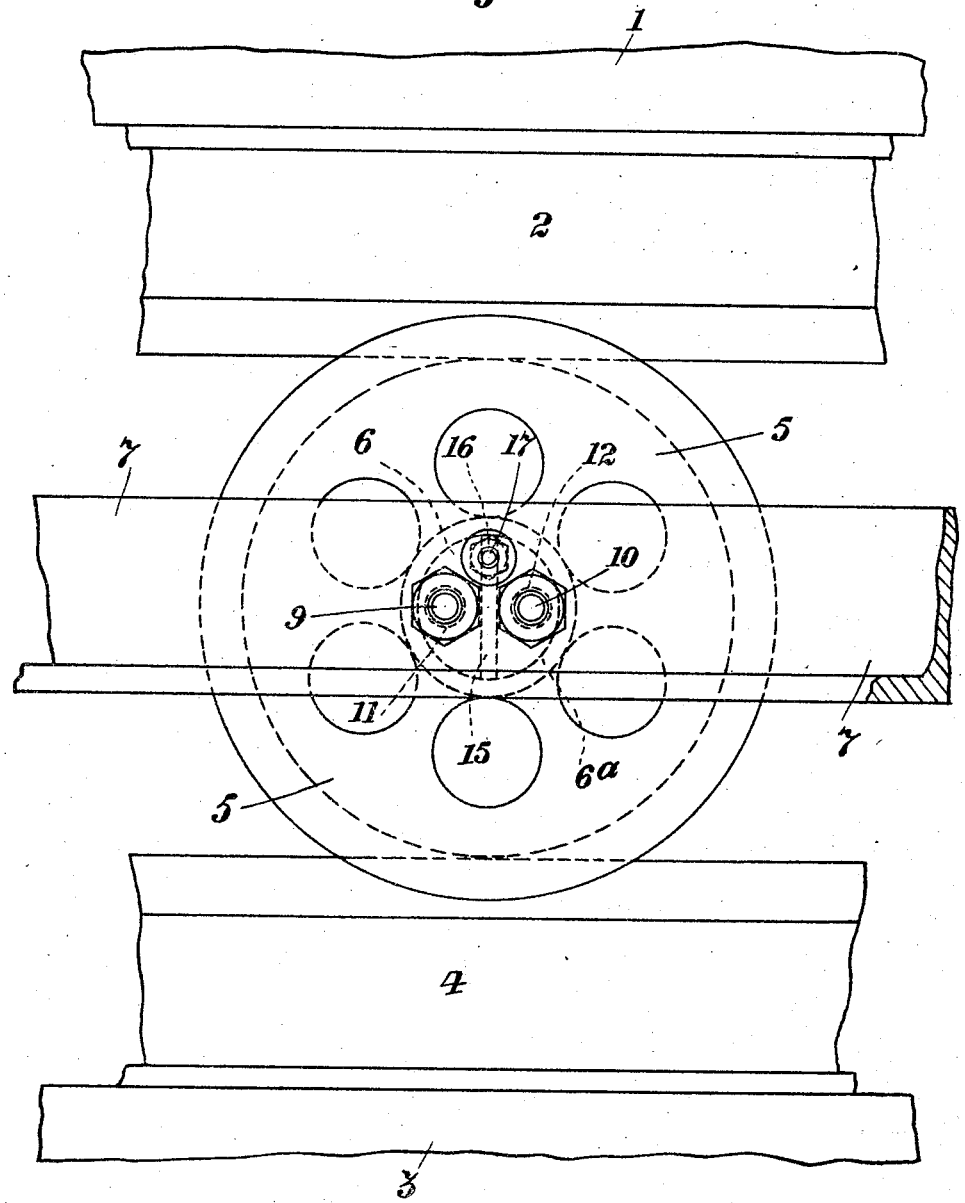
Fig. 2 is a front elevation corresponding to Fig. 1.

The upper removable platform 1 of the crane, excavator or the like is provided with a circular rail-track 2 and the lower platform or base 3 with a circular rail-track 4. Between the tracks 2 and 4 the bearing wheels or rollers 5 (one of which is shown in the drawings) are adapted to revolve. The bearing wheel 5 is rotatably mounted on the spindle distance piece 6 which is disposed between the outer and inner rings 7 and 8 respectively. As will be seen the member 6, which is cylindrical in shape, not only constitutes an enlarged spindle but also constitutes a distance piece and it does not pass through the rings 7, 8. To retain the member in place and also to prevent it revolving two bolts 9 and 10 are used and these bolts bind the rings together. Holes 11, 12, are made in the member for the passage of the bolts.

The means for lubricating the bearing surface 6ª of the member 6 comprises channels 15 and 16 and feed plug 17.

Preferably the outer and inner rings 7, 8, of the circular frame are of angle or channel section.

An advantage of this arrangement is that when it is desired to repair or replace a roller 5, or member 6, all that is necessary is to move the parts so as to bring the usual removable section of the upper rail over the roller to be removed. When this has been done, the section removed and the bolts 9, 10 and plug 17 withdrawn, the roller with its member 6 can be pulled upward out of place between the rings 7 and 8. The roller can be thereafter just as easily replaced or a new roller be fitted in position.

Having now fully described my invention what I claim and desire to secure by Letters Patent is:—

1. A roller bearing for a revolving crane turntable, or the like comprising, in combination, an outer cylindrical retaining ring; an inner cylindrical retaining ring; distance pieces extending between the two rings, said distance pieces being disposed at spaced intervals around the rings; two spaced rod members extending through the rings and distance pieces to rigidly secure them together and hold the distance pieces against rotation, and rollers rotatably mounted one on each of said distance pieces.

2. A roller bearing for a revolving crane turntable, or the like comprising, in combination, an outer cylindrical retaining ring; an inner cylindrical retaining ring; distance pieces extending between the two rings, said distance pieces being disposed at spaced intervals around the rings; a pair of bolt members for securing said distance pieces and rings rigidly and non-rotatably together; passages in one of said rings and in the distance pieces, said passages leading to the periphery of the distance pieces and rollers rotatably mounted one on each of said distance pieces.

In testimony whereof I affix my signature.

HUBERT OSWALD BEDGOOD.